United States Patent
Wilson et al.

(10) Patent No.: US 7,063,154 B2
(45) Date of Patent: Jun. 20, 2006

(54) METHODS OF TREATING SUBTERRANEAN ZONES AND TREATING FLUIDS THEREFOR

(75) Inventors: J. Michael Wilson, Duncan, OK (US); Phillip C. Harris, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 202 days.

(21) Appl. No.: 10/643,685

(22) Filed: Aug. 19, 2003

(65) Prior Publication Data
US 2005/0039918 A1   Feb. 24, 2005

(51) Int. Cl.
*E21B 43/12* (2006.01)
*E21B 43/26* (2006.01)

(52) U.S. Cl. .................. 166/294; 166/300; 166/305.1; 166/308.3; 166/308.5; 507/240; 507/244; 507/277

(58) Field of Classification Search ........... 166/285, 166/294, 300, 308.2, 308.3, 308.5, 305.1; 507/215, 216, 217, 240, 244, 267, 271, 273, 507/277, 903
See application file for complete search history.

(56) References Cited

U.S. PATENT DOCUMENTS

| 5,089,151 | A |   | 2/1992 | Hall et al. ............... 252/8.551 |
|---|---|---|---|---|
| 5,197,544 | A | * | 3/1993 | Himes ........................ 166/294 |
| 5,305,832 | A | * | 4/1994 | Gupta et al. ................ 166/300 |
| 5,380,706 | A | * | 1/1995 | Himes et al. ............... 507/129 |

* cited by examiner

*Primary Examiner*—George Suchfield
(74) *Attorney, Agent, or Firm*—Robert A. Kent; Baker Botts

(57) ABSTRACT

Methods of treating subterranean zones and treating fluids are provided. The methods are basically comprised of preparing or providing a subterranean zone treating fluid comprising an aqueous fluid and an additive for preventing the swelling and migration of formation clays in the subterranean zone selected from the group consisting of 1-carboxy-N,N,N-trimethyl methanaminium chloride, 2-hydroxy-N,N,N-trimethyl ethanaminium acetate, and 2-hydroxy-N,N,N-trimethyl 1-propanaminium acetate.

21 Claims, 1 Drawing Sheet

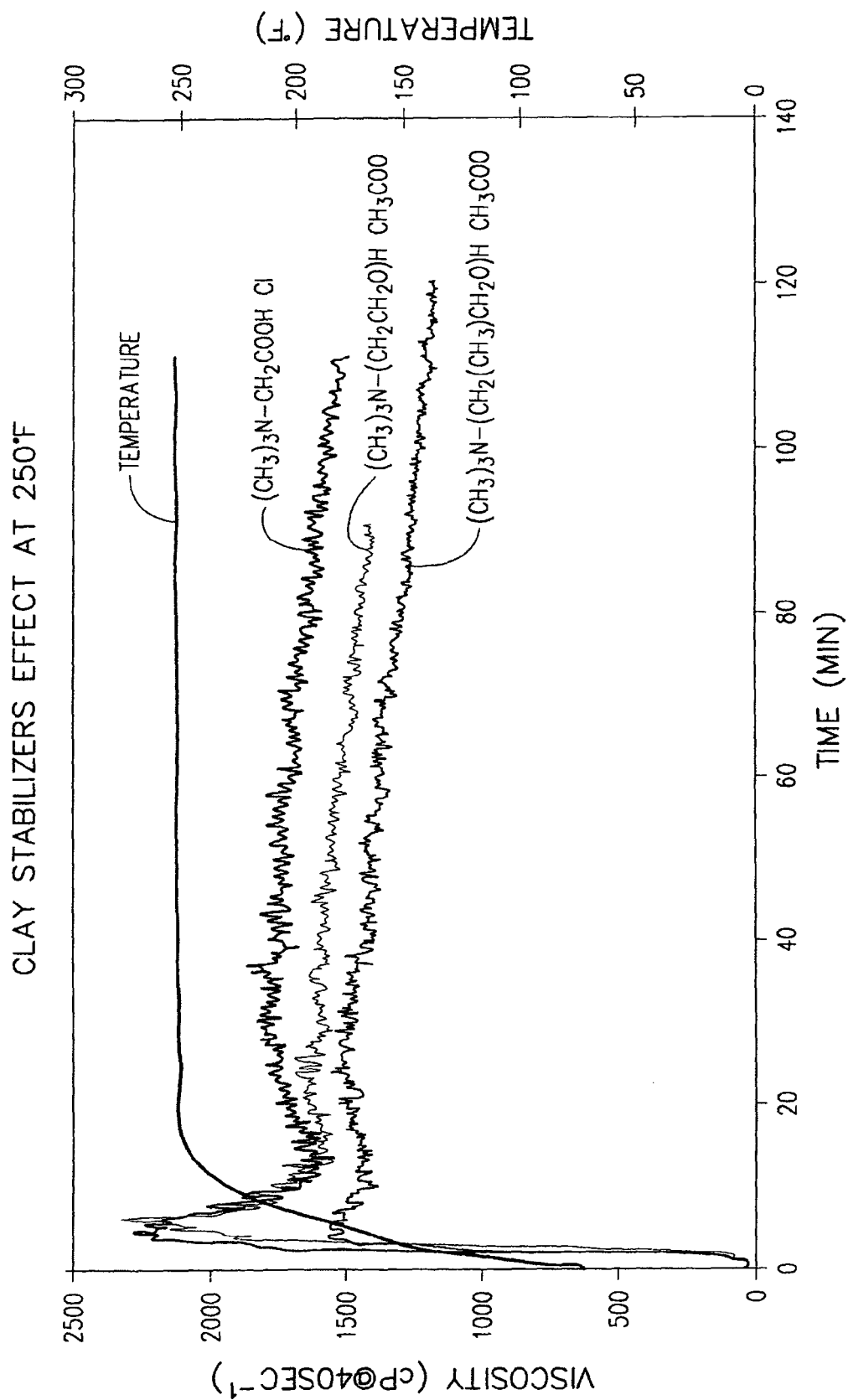

METHODS OF TREATING SUBTERRANEAN ZONES AND TREATING FLUIDS THEREFOR

BACKGROUND OF THE INVENTION

1. Field of the Invention

The present invention relates to methods of treating subterranean zones using treating fluids whereby the swelling and migration of formation clays is prevented and maximum hydrocarbon productivity from the subterranean zone results.

2. Description of the Prior Art

Hydrocarbon producing subterranean zones penetrated by well bores are often completed and stimulated using aqueous treating fluids. Depending on the particular treatment to be conducted, the aqueous treating fluids can be viscosified by the addition of viscosity increasing gelling agents or by gelling agents which are cross-linked by cross-linking agents. For example, subterranean hydrocarbon producing zones are often fractured by pumping viscous fracturing fluids therein at rates and pressures such that one or more fractures are formed in the zones. Proppant particles such as graded sand for propping the fractures are suspended in at least a portion of the fracturing fluids so that the proppant particles are deposited in the fractures when the fracturing fluids are broken. That is, viscosity breakers are included in the fracturing fluids whereby the fracturing fluids revert to thin fluids which are returned to the surface. The proppant particles deposited in the fractures when the fracturing fluids lose their viscosities function to prevent the fractures from closing so that conductive channels are formed through which produced hydrocarbons can readily flow.

Hydrocarbon producing subterranean zones often include clays that swell in the presence of water and migrate through the zones whereby the permeabilities of the zones are reduced. In addition, the aqueous treating fluids utilized heretofore have often damaged the proppant particle packs formed in fractures whereby the production of hydrocarbons through the proppant particle packs is reduced. The damage has been the result of gelled treating fluids that form filter cake on the fracture faces which subsequently break up and flow into and remain in the proppant particle packs. In addition, viscous treating fluids utilized heretofore have included high loadings of viscosity increasing gelling agents. When such fluids have been broken, i.e, reduced in viscosity, a significant amount of polymer residue attaches to the proppant particle packs thereby further reducing the produced hydrocarbon conductivity of the packs.

Thus, there are continuing needs for improved methods of treating subterranean zones using treating fluids that produce maximum hydrocarbon productivity from the zones.

SUMMARY OF THE INVENTION

The present invention provides improved methods of treating subterranean zones and improved treating fluids which meet the needs described above and overcome the deficiencies of the prior art. The methods of the present invention utilize treating fluids that are comprised of fresh water or salt water of low salt content, and additives for preventing the swelling and migration of formation clays selected from the group of 1-carboxy-N,N,N-trimethyl methanaminium chloride, 2-hydroxy-N,N,N-trimethyl ethanaminium acetate, and 2-hydroxy-N,N,N-trimethyl 1-propanaminium acetate.

In fracturing or other subterranean zone treatments that require viscous treating fluids, viscosity increasing gelling agents are included in the treating fluids. In accordance with this invention, the gelling agents are present in very low amounts so that damage to the subterranean zone and proppant particle packs formed therein is minimized. In addition, the additive included in the treating fluids of this invention prevents the swelling and migration of formation clays in the subterranean zone. As a result of the very low quantities of gelling agent and the presence of the clay swelling and migration preventing additive in the treating fluids, the treating fluids produce very little filter cake and/or residue in the subterranean zone whereby high hydrocarbon production rates result.

A method of this invention for treating a subterranean zone penetrated by a well bore is comprised of the following steps. A subterranean zone treating fluid is prepared or provided comprising an aqueous fluid and an additive for preventing the swelling and migration of formation clays in the subterranean zone. The additive is selected from the group consisted of 1-carboxy-N,N,N-trimethyl methanaminium chloride, 2-hydroxy-N,N,N-trimethyl ethanaminium acetate, and 2-hydroxy-N,N,N-trimethyl 1-propanaminium acetate. Thereafter, the treating fluid is introduced into the subterranean zone.

A method of this invention for fracturing a subterranean zone penetrated by a well bore is comprised of the following steps. A subterranean zone fracturing fluid is prepared or provided comprising an aqueous fluid, a viscosity increasing gelling agent and an additive for preventing the swelling and migration of formation clays in the subterranean zone. The additive is selected from the group consisted of 1-carboxy-N,N,N-trimethyl methanaminium chloride, 2-hydroxy-N,N,N-trimethyl ethanaminium acetate, and 2-hydroxy-N,N,N-trimethyl 1-propanaminium acetate. Thereafter the fracturing fluid is introduced into the subterranean zone at a rate and pressure sufficient to form one or more fractures in the zone and the fracturing fluid is recovered.

A subterranean zone treating fluid composition of this invention is comprised of an aqueous fluid and an additive for preventing the swelling and migration of formation clays in the subterranean zone selected from the group consisting of 1-carboxy-N,N,N-trimethyl methanaminium chloride, 2-hydroxy-N,N,N-trimethyl ethanaminium acetate, and 2-hydroxy-N,N,N-trimethyl 1-propanaminium acetate.

The objects, features and advantages of the present invention will be readily apparent to those skilled in the art upon a reading of the description of preferred embodiments which follows.

BRIEF DESCRIPTION OF THE DRAWING

In the drawing, a graph of viscosity versus time and temperature for the treating fluids of this invention are shown.

DESCRIPTION OF PREFERRED EMBODIMENTS

The methods and subterranean zone treating fluids of this invention produce very little filter cake or other residue in the subterranean zones whereby the hydrocarbon conductivity of the subterranean zones suffers very little damage as compared to the use of conventional treating fluids. The additives of this invention for preventing the swelling and migration of formation clays in subterranean zones allow lower gelling agent concentrations and higher treating fluid viscosities while producing very little damage to the treated subterranean zone. This in turn allows maximum hydrocarbon production from the subterranean zone to be realized.

A method of treating a subterranean zone penetrated by a well bore of this invention comprises the following steps. A subterranean zone treating fluid is prepared or provided comprising an aqueous fluid and an additive for preventing the swelling and migration of formation clays in the subterranean zone. Thereafter, the treating fluid is introduced into the subterranean zone.

The additives for preventing the swelling and migration of formation clays in the subterranean zone that can be utilized in accordance with this invention include 1-carboxy-N,N,N-trimethyl methanaminium chloride, [$(CH_3)_3N$—$CH_2COOH$ Cl], 2-hydroxy-N,N,N-trimethyl ethanaminium acetate [$(CH_3)_3N$—$(CH_2CH_2O)H$ $CH_3COO$] and 2-hydroxy-N,N,N-trimethyl 1-propanaminium acetate [$(CH_3)_3N$—$(CH_2(CH_3)CH_2O)H$ $CH_3COO$].

A subterranean zone treating fluid composition of this invention comprises an aqueous fluid and an additive for preventing the swelling and migration of formation clays in the subterranean zone selected from the group consisting of 1-carboxy-N,N,N-trimethyl methanaminium chloride, 2-hydroxy-N,N,N-trimethyl ethanaminium acetate, and 2-hydroxy-N,N,N-trimethyl 1-propanaminium acetate.

Of the above mentioned additives, 1-carboxy-N,N,N-trimethyl methanaminium chloride is the most preferred. The additive utilized is included in the treating fluid in an amount in the range of from about 0.1% to about 2.0% by weight of the aqueous fluid in the treating fluid.

The aqueous fluid in the treating fluid can be fresh water or salt water containing dissolved salts in no greater a concentration than about 3.5% by weight of the salt water.

When a viscous treating fluid is required such as when the subterranean zone is fractured, the treating fluid includes a viscosity increasing gelling agent. While a variety of viscosity increasing gelling agents can be utilized, preferred such gelling agents include, but are not limited to, galactomannan gums, modified or derivatized galactomannan gums, cellulose derivatives, xanthan biopolymer, succinoglycon biopolymer, polyacrylamides and polyacrylates. Specific preferred gelling agents of the forgoing types include hydroxyethylcellulose, hydroxypropylguar, guar and anionically charged carboxymethylguar, carboxymethylhydroxypropylguar, carboxyethylguar, carboxymethylhydroxyethylcellulose, succinoglycon biopolymer and xanthan biopolymer. Of these, anionically charged carboxymethylhydroxypropylguar is most preferred.

The viscosity increasing gelling agent utilized is included in the treating fluid in an amount in the range of from about 0.12% to about 0.96% by weight of the aqueous fluid in the treating fluid.

When required, a cross-linking agent for cross-linking the gelling agent and further increasing the viscosity of the treating fluid can be included in the treating fluid. Examples of cross-linking agents which can be utilized include, but are not limited to, borate releasing compounds, a source of titanium ions, a source of zirconium ions, a source of antimony ions and a source of aluminum ions. When used, the cross-linking agent is included in the treating fluid in an amount in the range of from 0.01% to about 1.0% by weight of the aqueous fluid in the treating fluid.

As a result of the low quantities of gelling agent, when used, and the low quantities of the additive for preventing swelling and migration of formation clays in the treating fluid, the treating fluid produces very little filter cake, residue and/or migrating clay and fines in a subterranean zone whereby the porosity of the subterranean zone is not impaired. As mentioned above, the presence of the additives of this invention for preventing the swelling and migration of formation clays and fines also allows the use of lower gelling agent concentrations and brings about higher treating fluid viscosities.

A method of this invention for fracturing a subterranean zone penetrated by a well bore comprises the following steps. A subterranean zone fracturing fluid is prepared or provided comprising an aqueous fluid, a viscosity increasing gelling agent and an additive for preventing the swelling and migration of formation clays in the subterranean zone. The additives which can be utilized include 1-carboxy-N,N,N-trimethyl methanaminium chloride, 2-hydroxy-N,N,N-trimethyl ethanaminium acetate, and 2-hydroxy-N,N,N-trimethyl 1-propanaminium acetate. The fracturing fluid is then introduced into the subterranean zone at a rate and pressure sufficient to form one or more fractures in the zone.

As is well understood by those skilled in the art, a particulate proppant material, e.g., graded sand, is generally included in a portion of the fracturing fluid along with a viscosity breaker whereby when the fracturing fluid is broken into a thin fluid, the particulate proppant material is deposited in the fractures so that proppant particle packs are formed therein. Thereafter, and the fracturing fluid is recovered from the zone.

The aqueous fluid, the viscosity increasing gelling agent, the additives for preventing the swelling and migration of formation clay and their amounts are the same as those set forth above in connection with the treating fluid composition of this invention.

A preferred method of this invention for treating a subterranean zone penetrated by a well bore comprises the steps of: (a) preparing or providing a subterranean zone treating fluid comprising an aqueous fluid and an additive for preventing the swelling and migration of formation clays in the subterranean zone selected from the group consisting of 1-carboxy-N,N,N-trimethyl methanaminium chloride, 2-hydroxy-N,N,N-trimethyl ethanaminium acetate, and 2-hydroxy-N,N,N-trimethyl 1-propanaminium acetate; and (b) introducing the treating fluid into the subterranean zone.

A preferred method of this invention for fracturing a subterranean zone penetrated by a well bore comprises the steps of: (a) preparing or providing a subterranean zone fracturing fluid comprising an aqueous fluid, a viscosity increasing gelling agent and an additive for preventing the swelling and migration of formation clays in the subterranean zone selected from the group consisting of 1-carboxy-N,N,N-trimethyl methanaminium chloride, 2-hydroxy-N,N,N-trimethyl ethanaminium acetate, and 2-hydroxy-N,N,N-trimethyl 1-propanaminium acetate; (b) introducing the fracturing fluid into the subterranean zone at a rate and pressure sufficient to form one or more fractures in the zone; and (c) recovering the fracturing fluid from the zone.

A preferred subterranean zone treating fluid composition of this invention comprises an aqueous fluid and an additive for preventing the swelling and migration of formation clays in the subterranean zone selected from the group consisting of 1-carboxy-N,N,N-trimethyl methanaminium chloride, 2-hydroxy-N,N,N-trimethyl ethanaminium acetate, and 2-hydroxy-N,N,N-trimethyl 1-propanaminium acetate.

In order to further illustrate the methods and compositions of this invention, the following example is given.

EXAMPLE

Various treating fluids were prepared in the laboratory comprising water, carboxymethylhydroxyproplyguar gelling agent present in an amount of 0.3% by weight of the water, sodium acetate-acetic acid buffer present in an amount of 0.02% by weight of the water, and the various clay swelling and migration preventing additives of this invention present in an amount of 0.4% by weight of water. The pH of the trating fluids was adjusted to 10.2 with potassium carbonate. A sodium thiosulfte gel stabilizer was then added in an amount of 0.3% by weight of the water along with a non-emulsifying surfactant in an amount of 0.1% by weight of the water. Thereafter, a zirconium cross-linker was added in an amount of 0.04% by weight of the water.

65 mL samples of each of the treating fluids having temperatures of 75° F. were placed in a high temperature Fann 50 viscometer equipped with a 420 spring, a 316 SS cup and a B2 bob. The bath was preheated to 250° F. The cup was rotated at 106 rpm-40 sec$^{-1}$ and thermal recovery was set at 5° F./min. The fluid viscosity versus time and temperature for each sample was recorded. The results of these tests are shown in the graph set forth in the drawing attached hereto.

From the graph, it can be seen that the additives of the present invention provide excellent rheological performnance.

Thus, the present invention is well adapted to carry out the objects and attain the ends and advantages mentioned as well as those which are inheritent therein. While numerous changes can be made by those skilled in the art, such changes are encompassed within the spirit of this invention as defined by the appended claims.

What is claimed is:

1. A method of treating a subterranean zone penetrated by a well bore comprising the steps of:
    (a) preparing or providing a subterranean zone treating fluid comprising
        an aqueous fluid,
        one or more salts in an amount up to about 3.5% by weight of the aqueous fluid, and
        an additive for preventing the swelling and migration of formation clays in said subterranean zone selected from the group consisting of 1-carboxy-N,N,N-trimethyl methanaminium chloride, 2-hydroxy-N,N,N-trimethyl ethanaminium acetate, and 2-hydroxy-N,N,N-trimethyl 1-propanaminium acetate; and
    (b) introducing said treating fluid into said subterranean zone.

2. The method of claim 1 wherein said additive in said treating fluid is 1-carboxy-N,N,N-trimethyl methanaminium chloride.

3. The method of claim 1 wherein said additive is present in said treating fluid in an amount in the range of from about 0.1% to about 2.0% by weight of said aqueous fluid in said treating fluid.

4. The method of claim 1 wherein said treating fluid further comprises a gelling agent.

5. The method of claim 4 wherein said gelling agent is selected from the group consisting of galactomannan gums, modified or derivatized galactomannan gums, cellulose derivatives, xanthan biopolymer, succinoglycon biopolymer, polyacrylamides, and combinations thereof.

6. The method of claim 4 wherein said gelling agent is selected from the group consisting of hydroxyethylcellulose, hydroxypropylguar, guar and anionically charged carboxymethylguar, carboxymethylhydroxypropylguar, carboxyethylguar, and carboxymethylhydroxyethylcellulose, and combinations thereof.

7. The method of claim 4 wherein said gelling agent is anionically charged carboxymethylhydroxypropylguar.

8. The method of claim 4 wherein said gelling agent is present in said treating fluid in an amount in the range of from about 0.12% to about 0.96% by weight of said aqueous fluid in said treating fluid.

9. The method of claim 4 wherein the gelling agent is at least partially crosslinked through a reaction comprising a cross-linking agent.

10. The method of claim 9 wherein said cross-linking agent is selected from the group consisting of borate-releasing compounds, source of titanium ions, source of zirconium ions, source of antimony ions, and a source of aluminum ions, and combinations thereof.

11. The method of claim 9 wherein said cross-linking agent is present in said treating fluid in an amount in the range of from about 0.01% to about 1.0% by weight of said aqueous fluid in said treating fluid.

12. A method of fracturing a subterranean zone penetrated by a well bore comprising:
    preparing or providing a subterranean zone fracturing fluid comprising
        an aqueous fluid,
        a gelling agent,
        one or more slats in an amount up to about 3.5% by weight of the aqueous fluid, and
        an additive for preventing the swelling and migration of formation clays in said subterranean zone selected from the group consisting of 1-carboxy-N,N,N-trimethyl methanaminium chloride, 2-hydroxy-N,N,N-trimethyl ethanaminium acetate, and 2-hydroxy-N,N,N-trimethyl-1-propanaminium acetate;
    introducing said fracturing fluid into said subterranean zone at a rate and pressure sufficient to form one or more fractures in said zone; and
    recovering said fracturing fluid from said zone.

13. The method of claim 12 wherein said additive in said treating fluid is 1-carboxy-N,N,N-trimethyl methanaminium chloride.

14. The method of claim 12 wherein said additive is present in said treating fluid in an amount in the range of from about 0.1% to about 2.0% by weight of said aqueous fluid in said treating fluid.

15. The method of claim 12 wherein said gelling agent is selected from the group consisting of galactomannan gums, modified or derivatized galactomannan gums, cellulose derivatives, xanthan biopolymer, succinoglycan biopolymer, polyacrylamides, and polyacrylates, and combinations thereof.

16. The method of claim 12 wherein said gelling agent is selected from the group consisting of hydroxyethylcellulose, hydroxypropylguar, guar and anionically charged carboxymethylguar, carboxymethylhydroxypropylguar, carboxyethylguar, and carboxymethylhydroxyethylcellulose, and combinations thereof.

17. The method of claim 12 wherein said gelling agent is anionically charged carboxymethylhydroxypropylguar.

18. The method of claim 12 wherein said gelling agent is present in said treating fluid in an amount in the range of from about 0.12% to about 0.96% by weight of said aqueous fluid in said treating fluid.

19. The method of claim 12 wherein the gelling agent is at least partially crosslinked through a reaction comprising a cross-linking agent.

20. The method of claim 19 wherein said cross-linking agent is selected from the group consisting of borate-releasing compounds, a source of titanium ions, source of zirconium ions, sources of antimony ions, and source of aluminum ions, and combinations thereof.

21. The method of claim 19 wherein said cross-linking agent is present in said treating fluid in an amount in the range of from about 0.01% to about 1.0% by weight of said aqueous fluid in said treating fluid.

* * * * *